United States Patent [19]

Herbst et al.

[11] Patent Number: 4,484,243
[45] Date of Patent: Nov. 20, 1984

[54] PROTECTIVE CIRCUIT ARRANGEMENT FOR A SHEATHED HEATING ELEMENT

[75] Inventors: LeRoy J. Herbst, Monroe, Conn.; Robert K. Hollenbeck, Louisville, Ky.; John M. Hooker, Louisville, Ky.; Thomas E. Jenkins, Louisville, Ky.; John L. Preher, Louisville, Ky.; Jimmy R. Rickard, Louisville, Ky.

[73] Assignee: General Electric Company, Louisville, Ky.

[21] Appl. No.: 430,901

[22] Filed: Sep. 30, 1982

[51] Int. Cl.³ .............................................. H02H 3/14
[52] U.S. Cl. ........................................ 361/50; 361/42; 361/104; 219/322; 219/509
[58] Field of Search ............. 361/42, 45, 47–50, 361/104; 219/322, 452, 509, 517, 363, 423, 481, 514, 519

[56] References Cited

U.S. PATENT DOCUMENTS

| | | | |
|---|---|---|---|
| 2,614,200 | 10/1952 | McNair | 219/322 |
| 3,377,462 | 4/1968 | Pferschy | 219/213 |
| 3,493,815 | 2/1970 | Hurtle | 317/16 |
| 3,600,634 | 8/1971 | Muench, Jr. | 317/16 |
| 3,654,515 | 4/1972 | Kato et al. | 361/45 |
| 3,727,105 | 4/1973 | Hochheiser | 317/16 |
| 3,864,581 | 2/1975 | Satyanarayana | 361/49 X |
| 3,936,702 | 2/1976 | Plasko | 317/40 A |
| 4,023,072 | 5/1977 | Plasko | 361/50 |
| 4,044,224 | 8/1977 | Jenkins et al. | 219/322 |
| 4,054,857 | 10/1977 | Bowling | 337/129 |
| 4,109,226 | 8/1978 | Bowling et al. | 337/130 |
| 4,219,857 | 8/1980 | Haraldsson et al. | 361/42 |

FOREIGN PATENT DOCUMENTS 946623  1/1964  United Kingdom ............... 219/452

OTHER PUBLICATIONS

Patent Application Ser. No. 282,574, filed 7/13/81 in the name of Carl E. Wellman et al.

*Primary Examiner*—Patrick R. Salce
*Attorney, Agent, or Firm*—H. Neil Houser; Radford M. Reams

[57] ABSTRACT

A protective circuit arrangement for sheathed heating elements which interrupts ground fault conditions by effectively decoupling the power line from the heating element regardless of the polarity of the power supply connections. A fusible link couples each side of the heating element to the power supply. A normally open switch responsive to current in the ground path switches a relatively low resistance shunt current path across the heating element when the ground current exceeds a predetermined threshold level. Closure of the shunt path enables sufficient current to flow in the power supply lines to actuate the fusible links. Circuit parameters are selected such that the current in the fusible link coupled to the hot power line is sufficiently greater than that in the fusible link coupled to the neutral line to cause the hot power line fusible link to be actuated first, thereby interrupting the fault condition and decoupling the hot power line from the heating element.

9 Claims, 3 Drawing Figures

PROTECTIVE CIRCUIT ARRANGEMENT FOR A SHEATHED HEATING ELEMENT

BACKGROUND OF THE INVENTION

The present invention relates generally to protective circuits for sheathed electrical resistance units. More particularly, the invention relates to circuits for reliably interrupting a ground fault in the form of an arcing short which may occur between the heating element and the grounded outer sheath of such a heating unit.

Sheathed electrical resistance heating units have been employed for many years in various products including, for example, dishwashers and electric ranges. Such heating units generally comprise a heating element in the form of a spiralled, electric resistance wire encased in an elongated, ceramic-filled, metallic outer sheath which is electrically conductive. The ceramic material transmits heat but, in its normal state, is an electrical insulator. Thus, the outer sheath becomes thermally hot but normally remains electrically insulated from the heating element. A suitable ceramic material is magnesium oxide. Sheathed electrical resistance heating units of this general type are described in U.S. Pat. No. 2,094,480 to Vogel; and U.S. Pat. No. 3,592,771 to Vedder et al.

In the operation of such heating units, particularly in dishwashers, the terminals of the heating element are connected to a power source, for example, a 60 Hz, 120 volt household AC power line. A 120 volt heating unit is normally connected between the hot or power line and the neutral line. Normally, the outer conductive sheath is grounded.

Though such heating units for the most part perform satisfactorily, one failure mode which is possible in such a heating unit is associated with a breakdown in the insulation qualities of the magnesium oxide separating the heating element from the outer sheath, accompanied by the formation of a current path between the element and the outer sheath. For reasons not fully presently understood, occasionally a discontinuity develops in the heating element resulting from a physical separation or break in the element itself. This break in the element creates an arc at the discontinuity between the two ends created by the break. The intense heat from the arc rapidly creates a plasma condition in which some of the magnesium oxide material in the vicinity of the arc is vaporized and some melted. The nature of the magnesium oxide is such that in its normal solid state it provides a very high resistance; however, in its molten liquid and gaseous plasma state the resistance becomes much less. Thus, as the magnesium oxide melts and vaporizes, eventually a current path of relatively low resistance is formed from the discontinuity through the gaseous and molten liquid MgO to the grounded metallic sheath. At this point, the arc transfers from one or both break-created ends of the heating element to the sheath. The force generated by this phenomenon may in some cases actually create a separation in the outer sheath. Once it starts, such a separation in the outer sheath travels lengthwise along the sheath. This phenomenon is commonly referred to as "zippering" because the propagation of the separation along the outer sheath resembles the opening of a zipper.

One device for rapidly terminating "zippering," should it occur in a heating element of the type employed in a dishwasher, is disclosed in commonly assigned U.S. Pat. No. 4,044,224 issued to Jenkins and Herbst. The Jenkins and Herbst device replaces the direct electrical connection between the outer conductive sheath and ground with a fusible link. During normal operation of the heating unit when the insulation material is intact, substantially no current flows through the outer sheath ground connection (with the exception of a small amount of AC leakage current largely the result of capacitive effects). However, when a fault occurs, sufficient current flows through the outer sheath ground connection, to cause the fusible link to open, thereby interrupting the fault current. Additional examples of switching and fuse arrangements responsive to changes in current supplied to the heating unit occasioned by ground faults may be found in commonly-assigned U.S. Pat. No. 4,054,857 to Bowling; and commonly-assigned, co-pending U.S. patent application Ser. No. 282,574 to Wellman and Hornung, as well as British Pat. No. 946,623 to Ryder. Each of these latter references discloses current actuated switching arrangements employed in ranges and cooking appliances to disconnect power from the heating unit in the event of a ground fault.

Arrangements of the foregoing type provide generally satisfactory results when the heating element and associated protective circuitry are properly connected to the power supply; that is, with the power line and neutral line connected to the intended appliance terminals. When so connected, the current actuated switch or fusible link is between the heating element and the hot or power line so that if fault current opens the switch the power line is effectively decoupled from the heating element. However, should such connections be reversed, the switch would only interrupt current flow in the return path to the power supply by decoupling the neutral line, with the result that power is not removed from the heating element and, except in the Jenkins and Herbst arrangement, the ground fault current would proceed undiminished.

Reversed connections may occur from time to time as a result of improper house wiring, improper appliance installation, and possibly errors in the internal wiring of the appliance. The present invention provides a simple, reliable, inexpensive protective circuit arrangement for such heating units which effectively interrupts ground fault conditions and removes power from the heating element regardless of which way the connections to the power supply are made.

SUMMARY OF THE INVENTION

The present invention provides a simple, reliable protective circuit arrangement which, when employed in the heating element power circuit of an appliance such as an automatic dishwasher, will interrupt ground fault conditions to terminate zippering when it occurs and effectively decouple the power line from the heating element regardless of the polarity of the power supply connections.

The interruption of the ground fault condition is accomplished by a separate over-current sensitive current interrupting member, such as a fusible link, which couples each side of the resistive heating element to the power supply. A relatively low resistance shunt current path is switchably placed in parallel with the heating element. A normally open switch responsive to current in the ground current path of the grounded sheath switches the shunt current path in parallel circuit with the heating element when the ground current exceeds a predetermined ground current threshold. Closing of the shunt current path enables sufficient current to flow in the power supply lines to actuate the current interrupting members. Circuit parameters are selected such that the current in the current interrupting member coupled to the hot power line is sufficiently greater than that in the current interrupting member coupled to the neutral line, to cause the hot power line current interrupting member to be actuated first, thereby interrupting the fault and decoupling the hot power line from the heating element.

In accordance with one form of the invention the current interrupting members are fuses characterized by a substantially continuous current versus response time function for a range of threshold current levels above rated level. For each fuse at any particular threshold current level the associated fuse response time, that is, the time current must be sustained at that level to actuate the fuse, lies within a tolerance range between a predetermined minimum and a predetermined maximum value. When the shunt current path is switched into the circuit, the current through the fuse connected to the power line comprises the shunt current, the heating element current and the ground fault current. The current through the fuse coupled to the neutral line comprises the shunt current and the heating element current. Under such conditions, the current levels in both fuses are normally sufficiently above rated current to actuate the respective fuses. To insure that the power line fuse is always actuated first, the ground current threshold level is selected such that the maximum response time associated with the current level in the power line coupling fuse is less than the minimum response time associated with the current level in the neutral line coupling fuse, the difference in current levels being at least equal to the threshold ground current level.

In the illustrative embodiment of the invention, the shunt current circuit comprises a relatively high power, low value resistor switched into parallel circuit with the heating element by a magnetic reed switch having a field coil serially connected between the ground terminal of the heating unit sheath and earth ground.

DETAILED DESCRIPTION OF THE INVENTION

While the novel features of the invention are set forth with particularity in the appended claims, the invention, both as to organization and content, will be better understood and appreciated from the following detailed description.

Figure 1:
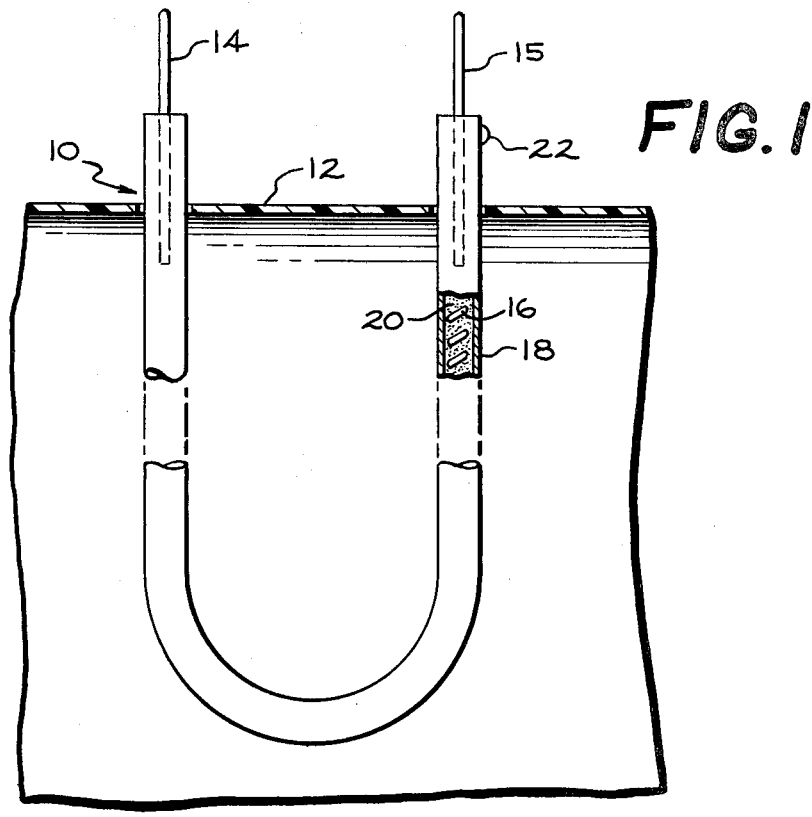
FIG. 1 shows the physical arrangement of a sheathed resistive heating unit mounted through the wall of a dishwasher appliance.

Referring now to FIG. 1, an electric resistance type heating unit 10 is shown projecting through a dishwasher polymeric resinous wall 12. The heating unit 10 includes low resistance terminals 14 and 15 which are electrically connected to opposite ends of a high resistance electrical element 16 encased in a metallic sheath 18 which, in turn, is filled with a ceramic insulating material 20. The low resistance terminals 14 and 15 project into the sheath a distance sufficient to prevent its ends from getting hot during operation of the heating unit. A grounding terminal 22 is formed on the exterior of metallic sheath 18 to facilitate connection to a grounding circuit coupling the sheath to an exterior earth ground. Sheathed electrical resistance heating units of this general type are described in the aforementioned U.S. Pat. No. 2,094,480 to Vogel, and U.S. Pat. No. 3,592,771 to Vedder et al, the disclosures of which are hereby incorporated by reference.

Figure 2:
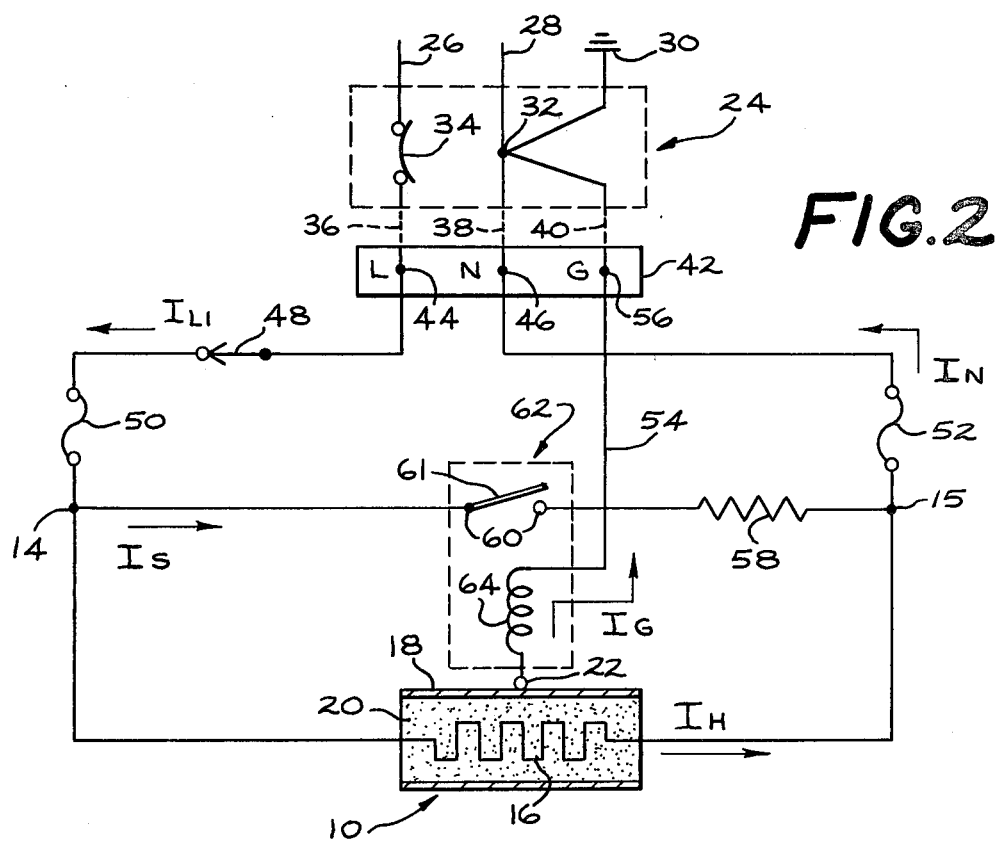
FIG. 2 is a schematic circuit diagram illustratively embodying the protective circuit arrangement of the present invention.

FIG. 2 schematically illustratively represents a protective circuit arrangement embodying the present invention for heating unit 10. The AC power source for the circuit comprises a conventional service entrance 24 such as is normally referred to as the "fuse box" or "circuit breaker box" in the home. The service entrance 24 is connected to "L" and "N" AC power lines 26 and 28. The "L" line 26 is the "hot" or power line which supplies a voltage relative to the "N" line 28 which is the "neutral" line. The "N" line is connected to the ground reference potential at various points in the home, including a typical ground connection to a cold water pipe represented schematically at 30. Within the service entrance 24, the "N" line 28 and the ground connection 30 are tied together at a grounding point 32. A protective circuit breaker 34 is interposed in series with the "L" power line 26.

The particular service entrance 24 illustrated may be considered as being a nominal 60 Hz, 120 volt AC unbalanced service with the "N" line 28 maintained at ground potential and the "L" line 26 maintained at approximately 120 volts AC relative to the "N" line 28. It will be appreciated that the unbalanced service entrance may comprise a portion of a 60 Hz 240 volt AC balanced service entrance.

The output of the service entrance 24 comprises AC power supply lines 36 and 38 which are extensions of the "L" and "N" or power and neutral lines 26 and 28 respectively. Typically, the "N" or neutral line 38 is identified by white insulation and the "L" or power line 36 is identified by black or red insulation.

Additionally, a ground (G) conductor 40 normally extends from the service entrance 24 and is typically connected to grounding point 32. Typically, the ground conductor 40 is identified either by green insulation or is a bare conductor.

A means within the appliance itself for supplying AC power to the appliance circuitry is shown in the form of a terminal strip 42. However, this internal AC power supply means may take other forms such as an ordinary AC power plug. One terminal 44 of the strip 42 is adapted for connection to power supply line 36 and another terminal strip 46 is adapted for connection to the other power supply line 38.

To supply power to the heating unit 10, one terminal 44 of terminal strip 42 is connected through a timer controlled switch 48 and an over-current sensitive current interrupting means 50 to one terminal 14 of heating element 16. To complete the main power circuit, the other terminal 15 of the heating element 16 is connected through a second over-current sensitive current interrupting means 52 to the other terminal 46 of terminal strip 42.

Lastly, there is provided means for connecting the conductive outer sheath 18 to the external earth ground reference potential. Specifically, the outer sheath 18 is connected by means of a grounding conductor 54 coupling grounding terminal 22 of sheath 18 to ground terminal 56 of terminal strip 42 and thereby through ground conductor 40 and grounding point 32 to the ground connection 30.

Interrupt or shunt circuit means is provided in the form of a relatively low value resistor 58 serially connected between terminal 15 of element 16 and one of normally open contacts 60 of current responsive switch means 62. The other one of contacts 60 is connected to terminal 14 of element 16. Closure of normally open contacts 60 places the serial combination of contacts 60 and resistor 58 in parallel circuit with heating element 16 across heating element terminals 14 and 15. Current responsive switch means 62 further includes a field coil 64 serially connected in ground line 54 between terminals 22 and 56 and operative to cause switch arm 61 to close contacts 60 when current through coil 64 exceeds a predetermined ground current threshold level.

Should a ground fault develop in the form of an arcing short between the heating element 16 and the sheath 18 resulting from a breakdown through the insulating ceramic material 20, current will begin to flow in ground conductor 54 through the coil 64. When this current reaches a predetermined ground current threshold level, the field created by coil 64 will cause switch arm 61 to close normally open contacts 60 of switch 62, thereby switching the shunt circuit means comprising resistor 58 into parallel circuit with heating element 16. Resistor 58 is of a sufficiently low resistance to normally draw current above the rated current levels for current interrupting means 50 and 52. As will be described in greater detail hereinafter, the ground fault current threshold level and the resistance of resistor 58 are chosen such that the current through current interrupting means 50, comprising the sum of the shunt current, designated $I_S$ in FIG. 2, the heating element current, designated $I_H$, and the ground current, designated $I_G$, is greater than the current through current interrupting means 52 comprising the sum of the shunt current $I_S$ and the heating element current $I_H$, the current differential between current through interrupt means 50 and interrupt means 52 being the ground current $I_G$. As will be described hereinafter, the magnitude of the predetermined ground current threshold level is set at a level which assures that whichever one of the current interrupt means is connected in the power line is actuated before the current interrupt means connected in the neutral line.

As mentioned in the background, a difficulty with prior art heater protection arrangements is their lack of effectiveness in the event connections to the power supply are inadvertently reversed, such as might result from improper house wiring, such as might result from the lines from the service entrance being incorrectly labeled, or the appliance being incorrectly installed, any of which might result in the connection of line 36 to terminal 46 and line 38 to terminal 44. Also, it is possible that the appliance may have been internally miswired such that terminal 14 is coupled through fusible link 50 and timer switch 48 to terminal 46, and terminal 15 is coupled through fusible link 52 to terminal 44.

The end result of any one of these errors would cause terminal 15 rather than terminal 14 of heating element 16 to be connected to the power or "hot" line 26. A protective circuit arrangement similar to that of FIG. 2, differing only by the deletion of the second current interrupt means 52, would work satisfactorily as long as terminal 14 is connected to line 26. However, should one of the above mentioned errors occur, terminal 15 would be connected to power line 26. Under such conditions, should a ground fault occur, switch 62 would close enabling sufficient current to flow in current interrupt means 50 to actuate it, but the circuit from the hot line to earth ground through the fault would remain closed and power line 26 would not be effectively decoupled from element 16.

The protective arrangement of the present invention functions effectively regardless of which one of terminals 44 and 46 are coupled to the power and neutral lines 26 and 28, respectively, through use of the two current interrupt means 50 and 52. In the event of a ground fault, current in each current interrupt means is normally above its rated level. Thus, a race condition could exist between the two interrupt means as to which would actuate first. To insure that the circuit reliably decouples the power line from the heating element, means must be provided to cause the current interrupt means in the hot or power line to always actuate first, regardless of the polarity of the power supply connections.

This is achieved in accordance with the present invention at least in part by proper selection of the ground current threshold level at which the shunt circuit is switched into the circuit, and the proper selection of the resistance for resistor 58 to provide an appropriate shunt current $I_S$ when the shunt current path is closed.

Figure 3:
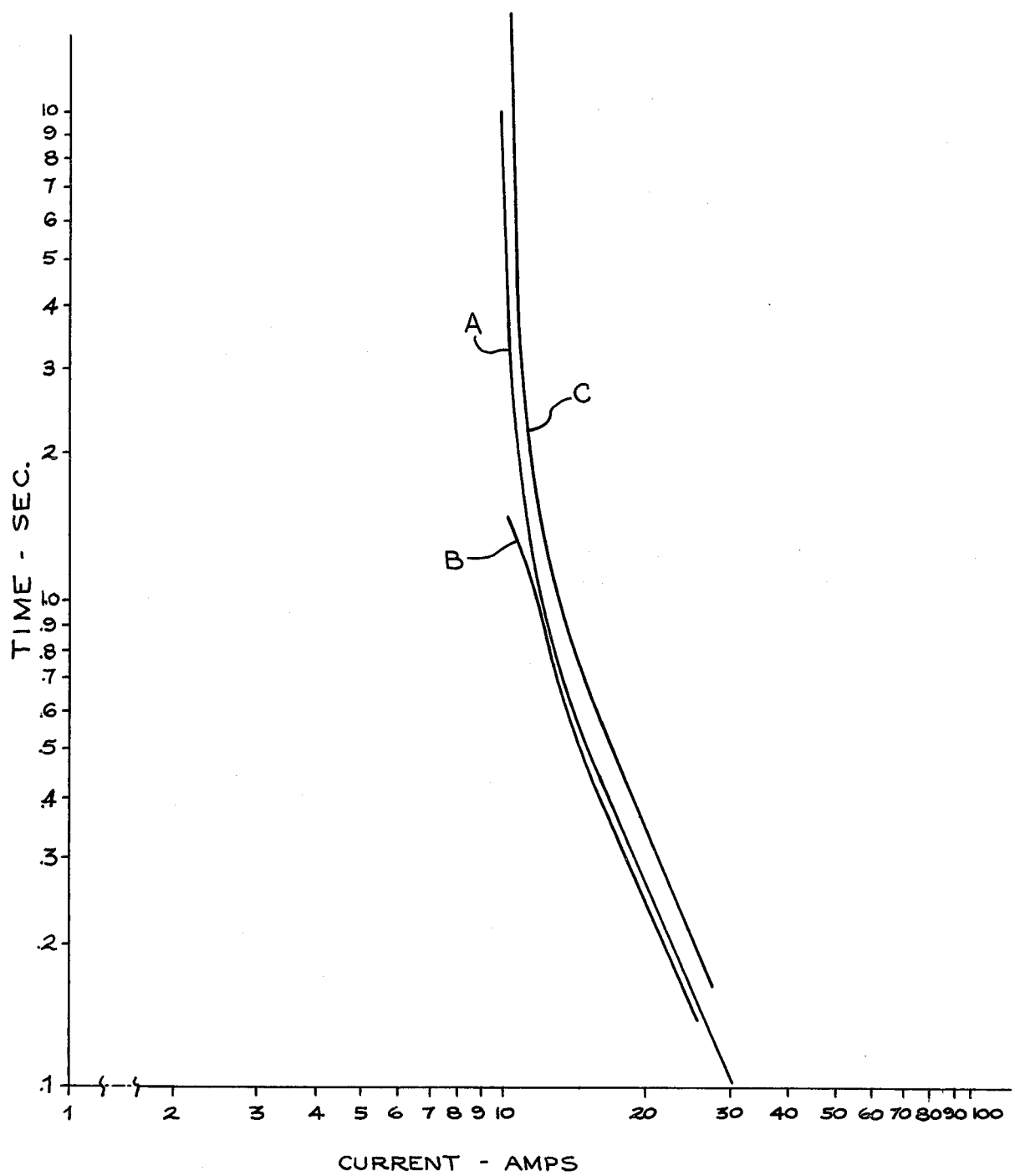
FIG. 3 is a set of characteristic response time versus current curves for the fuses employed in the circuit of FIG. 2.

In selecting parameters for the circuit of FIG. 2, tolerance variations in current interrupt means parameters must be taken into account. In the illustrative embodiment, each of the current interrupt means is provided in the form of a conventional fusible link or, more simply, a fuse having a characteristic current versus response time function at threshold levels above the rated current level for the fuse. That is, for current levels above the rated level, the fuse will actuate or "blow" if the current persists at a particular level for the response time associated with that level. Curve A of FIG. 3 represents the nominal current versus response time function for a standard 7 amp BUSS GLH or GJV type fuse readily commercially available from Bussman Division of McGraw-Edison. Due to manufacturing tolerances, each fuse device will not precisely track the nominal curve A. Rather, the response time at any particular threshold current level for a particular fuse device will fall within a tolerance range between a minimum response time represented in FIG. 3 by curve B and a maximum response time represented by curve C. The curves of FIG. 3 represent empirical data provided by the fuse manufacturer for fuses of the aforementioned type.

The current versus response time fuse characteristic is of paramount importance in setting the ground current threshold level. The selected ground current threshold level must provide a sufficient difference between the power line current and the neutral line current to avoid potential race conditions between the fuses. More specifically, the current differential must be sufficient to insure that the maximum response time (curve C) for the fuse responding to the power line current is less than the minimum response time (curve B) for the fuse responding to neutral line current. Absent any other design constraints, the higher the ground current threshold, the better, since the ground current is the difference between power line and neutral line current. However, ground currents tend to increase as the fault or zipper phenomenon progresses and thus high ground currents are typically associated with extreme zipper phenomena. To avoid extreme zipper failures, the ground current threshold must be set at a level which will normally be reached before the zipper phenomenon has progressed extensively.

A threshold ground current level on the order of 4.0–6.0 amps was selected based upon empirical observations that extreme zipper effects could be avoided in heating units of the illustrated type by interrupting such phenomena before the ground current exceeded 6.0 amps. It will be understood by those skilled in the art that the permissible range for the ground fault current threshold level depends upon the electrical characteristics of the heating unit to be protected and thus the appropriate range for a particular heating element design should be empirically determined for that particular design. A minimum threshold level of 4.0 amps is required to provide the necessary current differential between power line and neutral line to avoid the aforementioned race conditions for fuses of the type employed in the illustrative embodiment. Again, a different limit may be appropriate for current interrupt devices having different current versus time characteristics.

The components of the circuit of FIG. 2 will now be described in greater detail. The heating unit 10 for purposes of illustration is a standard General Electric sheathed heating unit typically used in automatic dishwashers rated at 500 watts at 115 volts, commercially available as General Electric Part No. 129D9074GO02. Resistor 58 is a wire wound 10 ohm ±5% resistor. A nominal value of 10 ohms is selected to provide a shunt current of approximately 9–13 amps for line voltage which may vary between 90–130 volts depending upon the power source in a particular geographic location. The power rating of resistor 58 must allow it to withstand the maximum shunt current for a period greater than the maximum fuse response time at the maximum voltage level. Preferably, resistor 58 should be capable of withstanding the maximum shunt current for at least four times the maximum fuse response time. Satisfactory results have been obtained in the circuit arrangement of FIG. 2 employing a wire wound 10 ohm resistor having a power rating of 22 watts.

Switch means 62 employes a general purpose rhodium flash over heavy copper magnetic reed switch readily commercially available from Standex Electronics (U.K.) Limited, similar to Part No. GR100, having a 10 VA power rating, a 45–55 ampere turn pull-in range and an approximate 1 millisecond operating time. Coil 64 of switch means 62 is a 3–4 turn coil. Switch 52 is set to close at a ground current threshold level in the range of 4.0–6.0 amps by controlling the number of turns of coil 64 during the production process.

Though not shown, a metallic oxide varistor (MOV) could be placed across terminals 44 and 46 of terminal strip 42 for added protection against lightning surges which could arc across contacts 60 welding them shut and thus trigger the protecting circuitry erroneously.

Operation of the circuit of FIG. 2 under certain extreme or "worst case" conditions will now be described. Consider first the low line voltage extreme case in which the supply voltage is 90 volts and tolerances are such that currents in the circuit will be minimum. Resistor 58 is at its maximum tolerance of 10.5 ohms; the ground current threshold is 4.0 amps; and finally the ground fault is assumed to cause a complete separation in the heating element so that heating element current $I_H$ is zero. Under such conditions, just after closure of switch 62 the shunt current will be approximately 8.6 amps, the ground current and the heater current will be 4.0 amps for a total current through fuse 50 of 12.6 amps and that through fuse 52 will be 8.6 amps. At 12.6 amps as derived from curve C of FIG. 2, the maximum response time will be approximately 1.1 seconds. Also, it will be apparent from curve C that at 8.6 amps the fuse will not actuate. Thus, fuse 50 will actuate rapidly enough to satisfactorily interrupt the fault and always actuate before fuse 52. Thus, for the given parameters for the circuit of FIG. 2, under "worst case" low voltage conditions the fuse in the power line will always actuate before the fuse in the neutral line.

The high line voltage extreme is the "worst case" condition for race conditions between fuses 50 and 52. In this case, the maximum currents flow in the heater, shunt, and ground lines. Since the current difference stays roughly the same but the current in each fuse is increased, the response times are closer together. For this condition, line voltage of 132 volts is assumed, resistor 58 is 9.5 ohms; the ground current threshold is 6.0 amps, and the heater element resistance is roughly 26 ohms. The fault is assumed to have occurred at the power line side of element 16, so that the ground fault provides a current path essentially in parallel with element 16 and none of the heater current $I_H$ is diverted through the fault. Under such conditions just after closure of switch 62, shunt current $I_S$ is 13.9 amps, the ground current $I_G$ is 6.0 amps, and the heater current $I_H$ is 5.25 amps for a total current through fuse 50 of approximately 25 amps. The total current through fuse 52 is approximately 19 amps. From curve C of FIG. 3, the maximum response time for 25 amps is approximately 0.21 seconds. From curve B of FIG. 3, the minimum response time at 19 amps is seconds. Consequently, even under these extreme worst case conditions, fuse 50 will always actuate before fuse 52.

It is apparent from the foregoing that the present invention provides an improved protective arrangement for sheathed heating units which effectively interrupts and terminates ground fault conditions regardless of the polarity of the circuit connections coupling the heating unit to the power supply.

While in accordance with the Patent Statute a specific illustrative embodiment of the present invention has been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A protective circuit arrangement for a sheathed heating unit having a resistive heating element encased in a ceramic filled conductive metallic sheath, a pair of terminals for coupling the resistive element to an external power supply of the type having a pair of supply lines comprising a power line and a neutral line, said protective arrangement comprising:
   first conductor means for coupling one of the heating element terminals to one of the supply lines;
   second conductor means for coupling the other one of the heating element terminals to the other one of the supply lines;
   first over-current sensitive current interrupt means responsive to the level of current in said first conductor means;

second over-current sensitive current interrupt means responsive to the level of current in said second conductor means;

each of said first and second current interrupt means are located in said first and second conductor means respectively and being operative to interrupt current flow in said first and second conductor means, respectively, when triggered by the current level in its correponding conductor means rising above an over-current threshold level;

ground current circuit means for providing a ground current path between the sheath and an external earth ground, shunting said second conductor means the level of ground current in said ground current path comprising the difference between the current level in said first conductor means and the current level in said second conductor means; and ground fault protection means comprising shunt circuit means operative when actuated to provide a relatively low resistance current path between said first and second conductor means effective to increase the level of current in said first and second conductor means sufficiently to rapidly trigger at least one of said first and second current interrupt means, and ground current sensing means responsive to current in said ground current path and operative to actuate said shunt circuit means upon sensing a ground current level in excess of a predetermined ground current threshold level indicative of the occurrence of a ground fault, said ground current threshold level being set to assure that the level of current in that one of said first and second conductor means coupling one of said heater terminals to the power line is sufficiently higher than the level of current in that one of said first and second conductor means coupling one of said terminals to the neutral line to cause the current interrupt means associated with said conductor means coupling the terminal to the power line to be triggered first;

whereby a ground fault results in a rapid interruption of current to the heating unit and the decoupling of the power line from the heating unit.

2. A protective circuit arrangement according to claim 1 wherein said first and second current interrupt means, each are characterized by a threshold current versus response time function, said response time varying inversely with threshold current level, the response time associated with any particular threshold level lying in a tolerance range between a predetermined minimum and a predetermined maximum time; and wherein said predetermined threshold ground current level is selected such that when said shunt circuit means is actuated, the maximum response time associated with the level of current in that one of said first and second conductor means coupling one of said heather terminals to the power line is less than the minimum response time associated with the level of current in the other one of said first and second conductor means whereby that one of said first and second current interrupt means responsive to the power line current will always be triggered before the other one of said current interrupt means.

3. A protective circuit arrangement according to claim 2 wherein said shunt circuit means comprises a relatively low resistance shunt current path between said heating element terminals in parallel circuit with said heating element; and switch means responsive to current in said ground current circuit operative to close said shunt current path when actuated by said ground current exceeding said predetermined ground current threshold level, the current in that one of said first and second conductor means coupling to said neutral line following closure of said switch being less than the current in that one of said first and second conductor means coupling to the power line by an amount at least equal to the ground current threshold level.

4. A protective circuit arrangement according to claim 3 wherein said switch means comprises a current actuated reed switch including an actuating coil serially connected in said ground current circuit between the sheath and the earth ground.

5. A protective circuit arrangement according to claim 4 wherein said first and second current limiting means comprise first and second fusible links, each serially connected to its associated conductor means.

6. A protective circuit arrangement comprising:

a sheathed heating unit comprising a resistive heating element encased in a ceramic filled conductive sheath, said resistive heating element including a pair of terminals adapted for coupling to an external power supply of the type having a pair of supply lines comprising a power line and a neutral line;

first conductor means for coupling one of said heating element terminals to one of the supply lines;

second conductor means for coupling the other one of said heating element terminals to the other one of the supply lines;

first fuse means responsive to the current in said first conductor means;

second fuse means responsive to the current in said second conductor means;

said first and second fuse means are located in said first and second conductor means respectively and each being characterized by a threshold fuse current versus response time function which defines the period of time current through said fuse must persist at a particular threshold level to trigger said fuse, the response time varying inversely with threshold level; for each of said fuses the response time associated with a particular threshold fuse current level lying in a tolerance range between a predetermined maximum fuse time and a predetermined minimum fuse time; and ground current circuit means providing a ground current path from said sheath to an external earth ground, shunting said second conductor means the ground current comprising the difference between the current in said first conductor means and the current in said second conductor means;

shunt current circuit means providing a selectively closed relatively low resistance shunt current path in parallel circuit with said heating element;

said shunt current circuit means operative when said shunt current path is closed to draw sufficient current through at least one of said fuse means to exceed the threshold current level;

said shunt current circuit means including switch means for controlling closure of said shunt current path, said switch means being responsive to current flow in said ground current path and operative to close said shunt current path when the level of current in said ground path exceeds a predetermined ground current threshold level, said ground current threshold level being selected such that the maximum fuse response time associated with the current level in that one of said first and second conductor means coupled to the power line is less than the minimum fuse response time associated with the current level in the other conductor means;

whereby the fuse means responsive to whichever one of said first and second conductor means is coupled directly to the power line will always be actuated before the fuse means responsive to that one of said first and second conductor means coupled directly to the neutral line.

7. The protective circuit of claim 6 wherein said switch means comprises a magnetic reed switch comprising a field coil serially connected in said ground current path and a pair of normally open terminals; and wherein said shunt current path comprises a resistance means serially connected with said normally open terminals, the serial combination of said resistance means and said contacts being connected in parallel circuit with said resistive heating element.

8. A protective circuit arrangement comprising:
a heating unit comprising a resistive heating element encased in a ceramic filled conductive sheath, said resistive element including a pair of terminals for connecting said element to an external power supply of the type having a pair of supply lines comprising a power line and a neutral line;

first fuse means for serially connecting one of said element terminals to one of the supply lines;

second fuse means serially connecting the other one of said element terminals to the other one of the supply lines;

each of said first and second fuse means being characterized by a threshold current versus response time function and operative when actuated to interrupt current to said heating element, each of said fuse means being actuated when the current therethrough is sustained at a level at least equal to a threshold level for a period of time at least equal to the response time associated with that current threshold level in accordance with the current versus time function;

shunt circuit means comprising a relatively low resistance shunt current path switchably connected in parallel circuit with said heating element operative when connected in parallel circuit to increase the level of current in the supply lines to a level sufficient to actuate at least one of said first and second fuse means;

ground current circuit means coupling said sheath to an external ground providing a ground current path therebetween, shunting said second fuse means the level of current in said ground current path comprising the difference between the current in the power line and the current in the neutral line;

switch means responsive to ground current in said ground current path and operative to switch said shunt current path in parallel circuit with said heating element when ground current exceeds a predetermined ground current threshold level;

said ground current threshold level being selected such that the response time associated with the level of current in the power line is less than the response time associated with the level of current in the neutral line, whereby that one of said first and second fuse means connected to the power line opens before the other one of said fuse means thereby effectively decoupling the power line from the heating unit when a ground fault is detected regardless of which side of said heating element is connected to the power line.

9. A protective circuit arrangement in accordance with claim 8 wherein said switch means comprises a magnetic reed switch comprising a set of normally open contacts operative when closed to switch said shunt current path in parallel circuit with said heating element, and a field coil serially connected in said ground current path operative to close said normally open contacts when the ground current level exceeds said predetermined ground current threshold level.

* * * * *